(12) United States Patent
Gehrig et al.

(10) Patent No.: US 8,141,846 B2
(45) Date of Patent: Mar. 27, 2012

(54) VACUUM SEALING SYSTEM AND DEVICE

(76) Inventors: Mark Gehrig, Elk Grove, CA (US);
Kirk Carter, Elk Grove, CA (US);
Kenneth W. Harrison, Fair Oaks, CA (US); Dalny Travaglio, Kensington, CA (US)

( * ) Notice: Subject to any disclaimer, the term of this patent is extended or adjusted under 35 U.S.C. 154(b) by 960 days.

(21) Appl. No.: 12/136,756

(22) Filed: Jun. 10, 2008

(65) Prior Publication Data
US 2009/0302257 A1    Dec. 10, 2009

(51) Int. Cl.
*F16K 1/16* (2006.01)
(52) U.S. Cl. ........................ 251/193; 251/301
(58) Field of Classification Search .......... 251/301–303, 251/193, 195–202
See application file for complete search history.

(56) References Cited

U.S. PATENT DOCUMENTS

| | | | | |
|---|---|---|---|---|
| 6,390,448 | B1 * | 5/2002 | Kroeker et al. | 251/167 |
| 6,776,394 | B2 * | 8/2004 | Lucas | 251/259 |
| 6,902,145 | B2 * | 6/2005 | Latzer et al. | 251/170 |
| 7,270,311 | B1 * | 9/2007 | Brenes | 251/175 |
| 2007/0138424 | A1 * | 6/2007 | Geiser | 251/301 |

* cited by examiner

*Primary Examiner* — John Bastianelli (57) ABSTRACT

An apparatus for a gate valve between chambers includes a valve housing defining a flow path. A male valve portion is rotatable on a fixed axis in the housing. The male valve portion including a first male mating surface positioned at a first angle less than perpendicular to the axis. A female valve portion is fixed in the valve housing for receiving the male portion. The female valve portion including a first female mating surface positioned at a second angle matching the first angle. An o-ring seals the male valve portion to the female valve portion when the male valve portion is rotated into the female valve portion. A polished surface contacts the o-ring when the male valve portion is rotated. When the male valve portion is rotated into the female valve portion the o-ring is compressed thereby sealing the gate valve and closing the flow path.

16 Claims, 10 Drawing Sheets

SECTION A-A

VACUUM SEALING SYSTEM AND DEVICE

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to vacuum process control. More particularly, the invention relates to a device that utilizes vacuum chambers in conjunction with a pendulum valve that uses a male wedge rotating on a fixed shaft into a fixed female wedge to perform the vacuum sealing function.

BACKGROUND OF THE INVENTION

Figure 1:
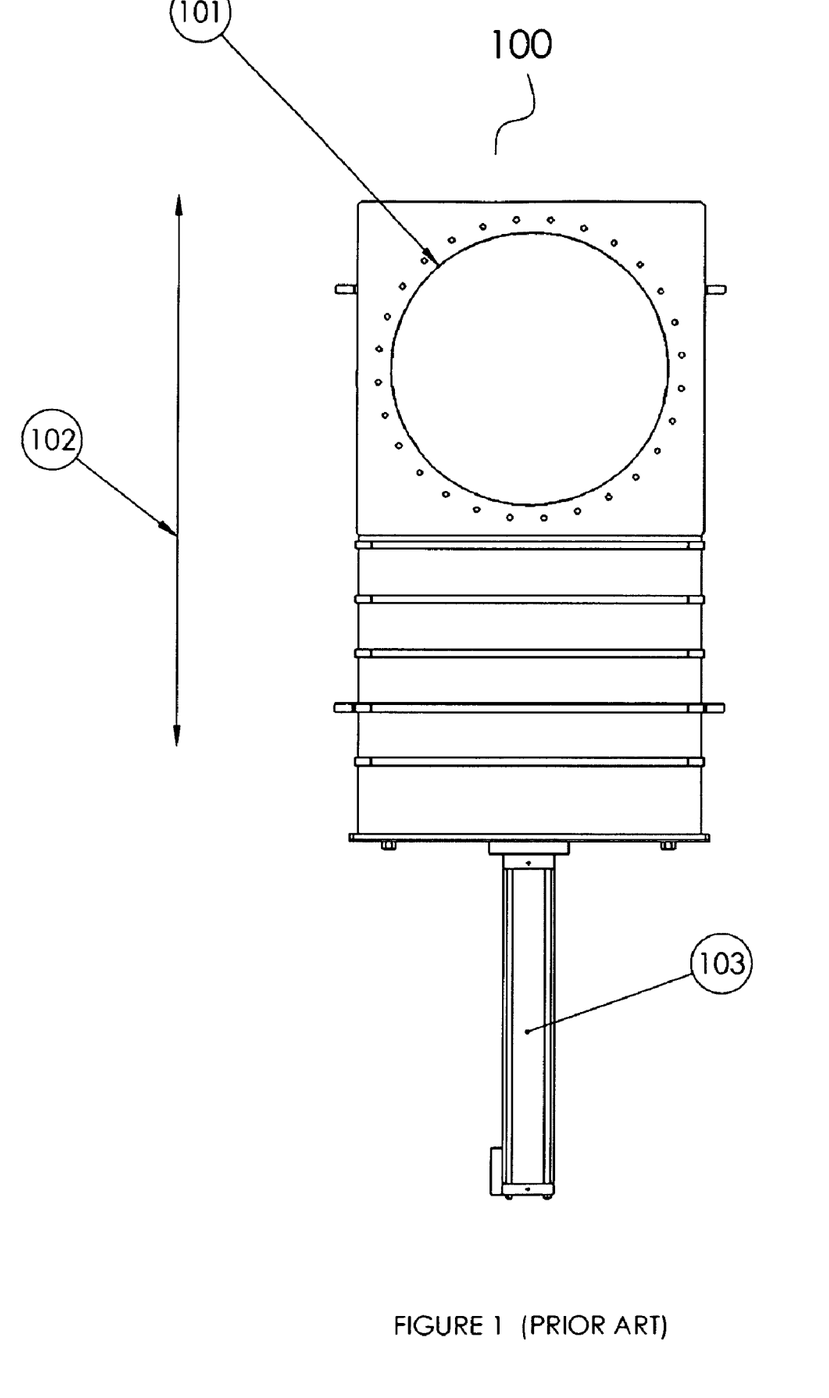
FIG. 1 illustrates an exemplary rectangular gate valve, in accordance with the prior art.

Within vacuum process control industries there is a growing demand for smaller, more inexpensive and more reliable valves to isolate certain components in a system and to enable these components to operate under vacuum conditions. There are a number of different types of valves currently known for isolating components in a system. For example, without limitation, rectangular gate valves are the most common in the industry. FIG. 1 illustrates an exemplary rectangular gate valve 100, in accordance with the prior art. A gate 101 of rectangular gate valve 100 moves in a straight line in order to seal rectangular gate valve 100. The movement of gate 101 in the present example is indicated by an arrow 102. Rectangular gate valves typically require an air cylinder to actuate the valve, adding the length of the air cylinder to the overall length of the valve. For example, without limitation, referring to FIG. 1, an air cylinder 103 of gate valve 100 practically doubles the length of rectangular gate valve 100.

Pendulum valves are also currently used in vacuum process control industries. A pendulum valve offers a smaller overall footprint than a rectangular gate valve, making pendulum valves desirable in systems where space is an issue. Rather than sliding in a straight line, the gate of a pendulum valve rotates on a shaft, driven by a set of links that rotate a drive arm and thus the gate of the valve into an opening. The air cylinder required to rotate a pendulum valve can be mounted on the valve body, thus saving space. Pendulum valves currently being used in the vacuum process controls industry typically use a gate that moves parallel to the valve body, and uses a complex series of links and wheels to lock and seal the valve in a closed position. While currently known pendulum valves rotate on shafts to seal the valve closed, there are no wedges or angled surfaces to facilitate the sealing of the valves. Thus, pendulum valves use basically the same mechanism to close and seal the valve as standard rectangular gate valves, for example, without limitation, gate valve 100, shown by way of example in FIG. 9.

In view of the foregoing, there is a need for improved techniques for providing small, reliable and inexpensive valves for use in vacuum pressure systems that uses simple means for creating a vacuum tight seal.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2, 3, 4, 5, and 6 illustrate an exemplary dual wedge valve, in accordance with an embodiment of the present invention.

FIGS. 8, 9 and 10 illustrate an exemplary single wedge gate valve, in accordance with an embodiment of the present invention.

Unless otherwise indicated illustrations in the figures are not necessarily drawn to scale.

SUMMARY OF THE INVENTION

To achieve the forgoing and other objects and in accordance with the purpose of the invention, a vacuum sealing system and device is presented.

In one embodiment, an apparatus for a gate valve between chambers is presented. The apparatus includes a valve housing defining a flow path between the chambers. A male valve portion is rotatable on a fixed axis in the housing. The male valve portion including at least a first male mating surface positioned at a first angle less than perpendicular to the axis. A female valve portion is fixed in the valve housing for receiving the male portion. The female valve portion including at least a first female mating surface positioned at a second angle matching the first angle. An o-ring seals the male valve portion to the female valve portion when the male valve portion is rotated into the female valve portion from a fully open position to a fully closed position. A polished surface contacts the o-ring when the male valve portion is rotated. Means for providing a sliding action between the male valve portion and the female valve portion when the male valve portion is rotated into the female valve portion. The means for providing a sliding action compressing the o-ring in the fully closed position thereby sealing the gate valve and closing the flow path. Means for rotating the male valve portion between the fully open position and the fully closed position. Another embodiment further includes means for linking the means for rotating and the male valve portion where the linking means maintains the male valve portion in the fully closed position when the means for rotating is inoperative. In other embodiments the chambers are vacuum pressure chambers and the o-ring provides a vacuum tight seal and the male valve portion is rotatable when pressures in the chambers are differentiated. In yet another embodiment the means for rotating is continuously operable for throttling between the fully open position and the fully closed position. In other embodiments the male valve portion further includes a second male mating surface positioned at a third angle less than perpendicular to the axis, the female valve portion further includes a second female mating portion positioned at a fourth angle matching the third angle, the o-ring is on the first male mating surface, the polished surface in on the first female mating surface and the sliding action means provides the sliding action between the second male mating surface and the second female mating surface. In yet other embodiments, the male valve portion further includes a second male mating surface substantially perpendicular to the axis, the female valve portion further includes a second female mating portion substantially perpendicular to the axis, the o-ring is on the first female mating surface, the polished surface in on the first male mating surface and the sliding action means provides the sliding action between the second male mating surface and the second female mating surface.

In another embodiment an apparatus for a gate valve between chambers is presented. The apparatus includes a valve housing defining a flow path between the chambers. A male valve portion is rotatable on a fixed axis in the housing. The male valve portion includes a first male mating surface positioned at a first angle less than perpendicular to the axis and a second male mating surface positioned at a second angle less than perpendicular to the axis. A female valve portion is fixed in the valve housing for receiving the male portion. The female valve portion including a first female mating surface positioned at a third angle matching the first angle and a second female mating surface positioned at a fourth angle matching the second angle. An o-ring is positioned on the first male matting portion for sealing the male valve portion to the female valve portion when the male valve portion is rotated into the female valve portion from a fully open position to a fully closed position. A polished surface on the first female portion contacts the o-ring when the male valve portion is rotated. A slider is between the second male valve portion and the second female valve portion where when the male valve portion is rotated into the female valve portion, the slider provides a sliding action and compresses the o-ring in the fully closed position thereby sealing the gate valve and closing the flow path. An actuator rotates the male valve portion between the fully open position and the fully closed position. Other embodiments further include a linkage between the actuator and the male valve portion where the linkage maintains the male valve portion in the fully closed position when the actuator looses power and the linkage includes a three-part linkage. In another embodiment the male and female mating portions further include generally circular shapes. In still other embodiments the o-ring is positioned in an o-ring groove and the slider includes a Kynar rod in an o-ring groove on the second male mating surface. In yet other embodiments the chambers are vacuum pressure chambers and the o-ring provides a vacuum tight seal and the male valve portion is rotatable when pressures in the chambers are differentiated. In yet another embodiment the actuator is continuously operable for throttling between the fully open position and the fully closed position.

In another embodiment an apparatus for a gate valve between chambers is presented. The apparatus includes means for housing the gate valve defining a flow path between the chambers, means for closing the flow path, means for receiving the means for closing, means for sealing the means for closing and the means for receiving, means for contacting the means for sealing in a low friction manner, means for providing a sliding action between the means for closing and the means for receiving and means for rotating the means for closing between a fully open position and a fully closed position. Yet another embodiment further includes means for linking the means for rotating and the means for closing.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention will now be described in detail with reference to embodiments thereof as illustrated in the accompanying drawings.

Preferred embodiments of the present invention provide a cost-effective, reliable and efficient valve, with few moving parts, that is installed in a vacuum pressure system. In a preferred embodiment, a male wedge arm with a sealing o-ring mounted on the male wedge arm, swinging on a fixed axis into a fixed female wedge, closes the valve and creates a vacuum tight seal. The use of a wedge design eliminates the need for a number of ball bearings, bellows and other parts that are currently used in standard gate valves, such as, but not limited to, links, pins, welded gate frames, wheels, etc. Preferred embodiments may be implemented as dual wedge valves or single wedge valves. A valve according to preferred embodiments is unique in that it uses a pendulum style motion, along with a wedge style arm and valve seat to seal the valve. It is contemplated that fewer parts per assembly in preferred embodiments will result in a more cost-effective and reliable valve. Preferred embodiments generally do not require adjusting, although adjusting is provided with some embodiments. Furthermore, preferred embodiments have the ability to open under differentiated pressure because a sliding action rather than a lifting action is used to open the valve.

Figure 2:
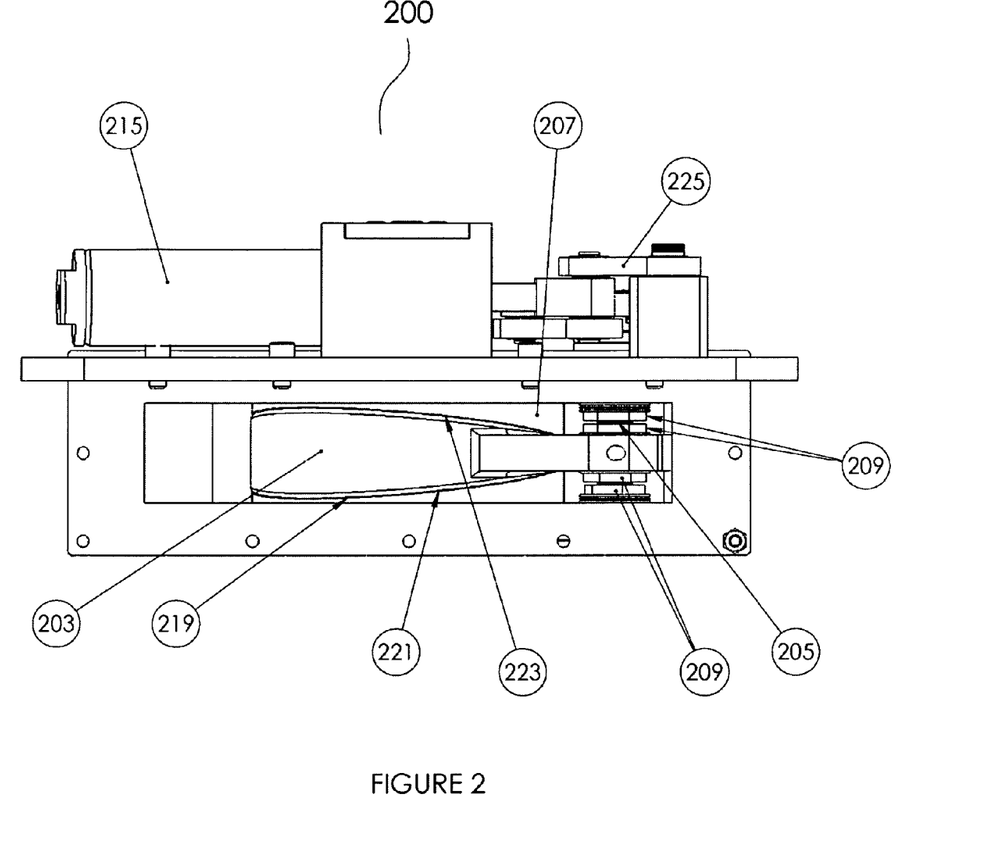
FIG. 2 is a side view of the valve in a closed position, where body covers of the valve have been removed to show the inside of the valve.
Figure 3:
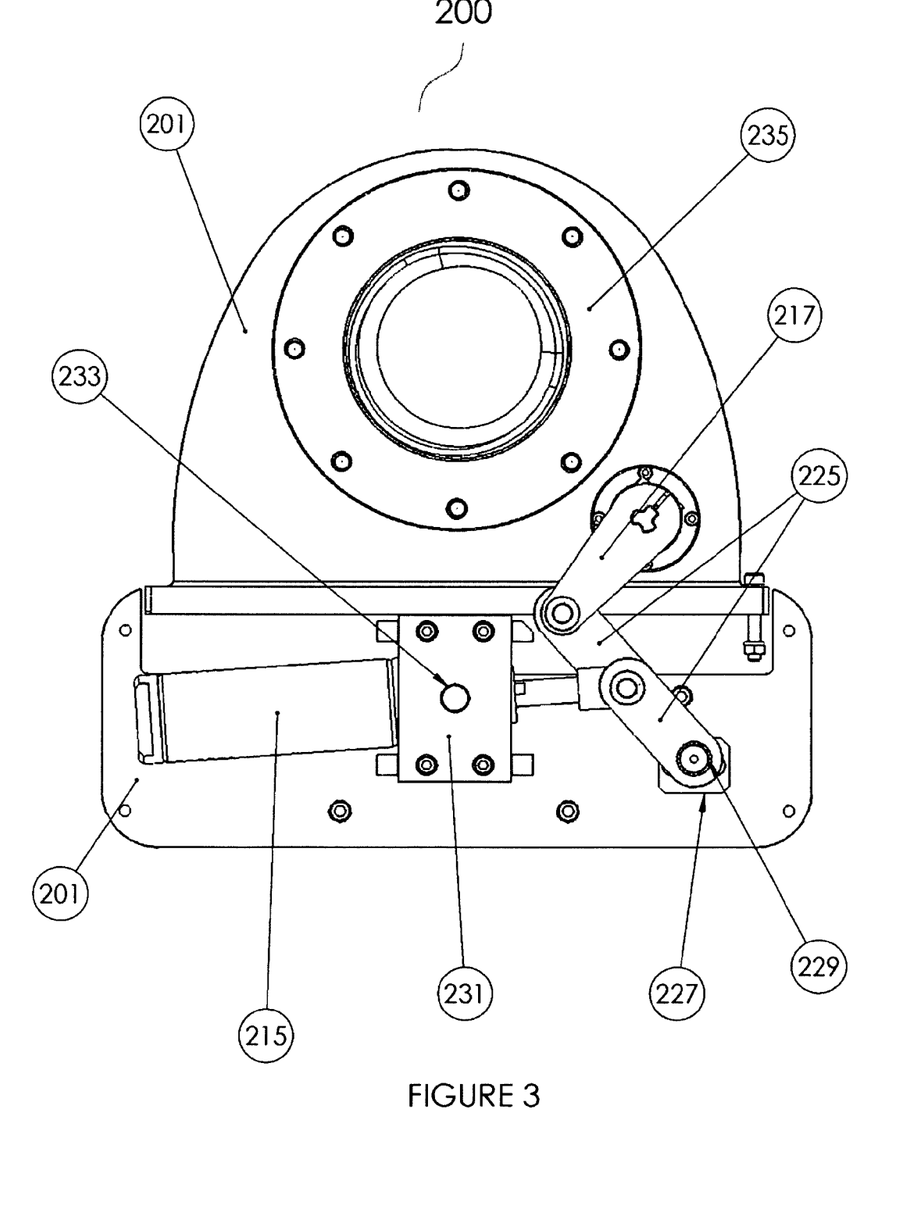
FIG. 3 is a top view of the valve in the closed position.
Figure 4:
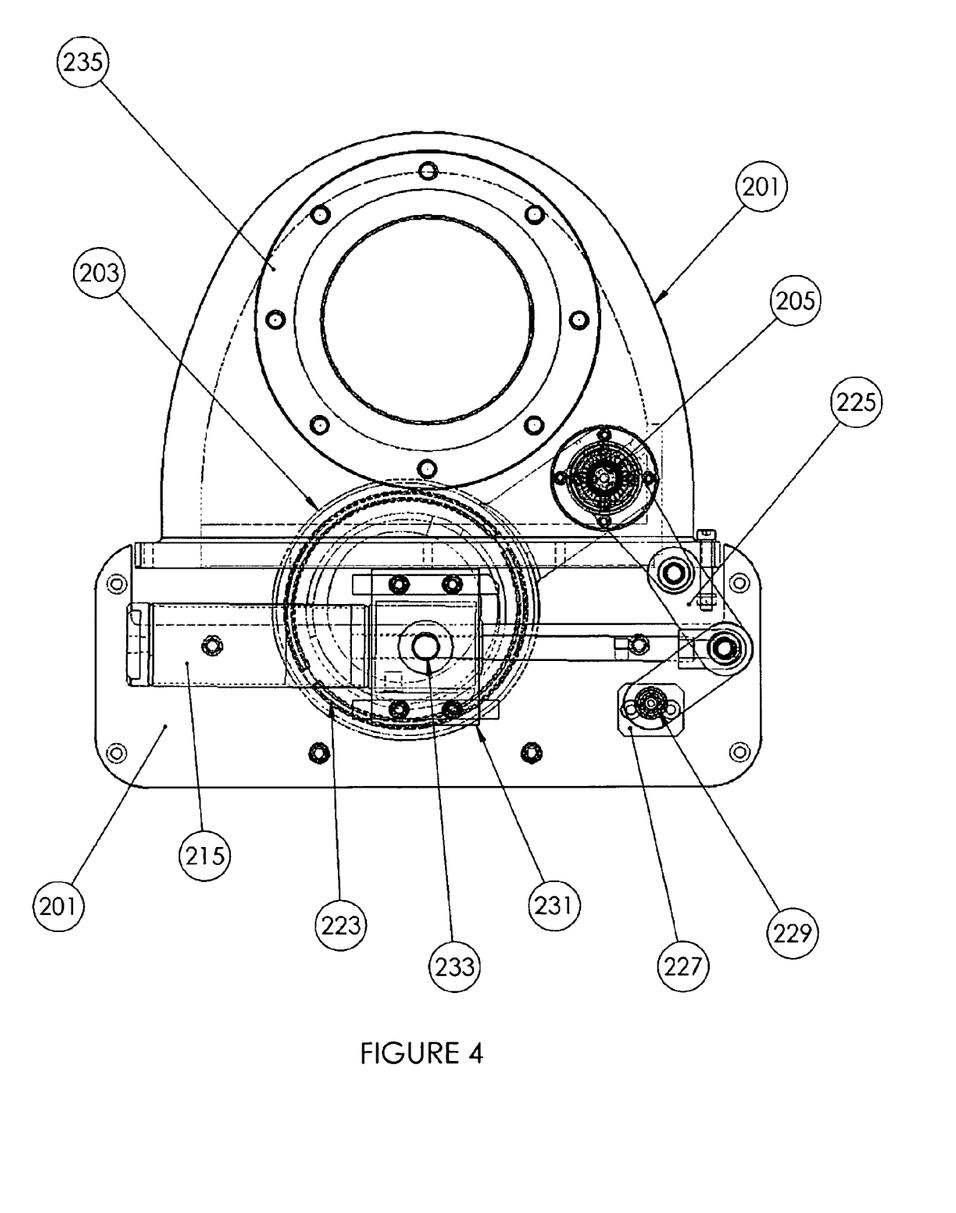
FIG. 4 is a top, transparent view of the valve in an open position.
Figure 5:
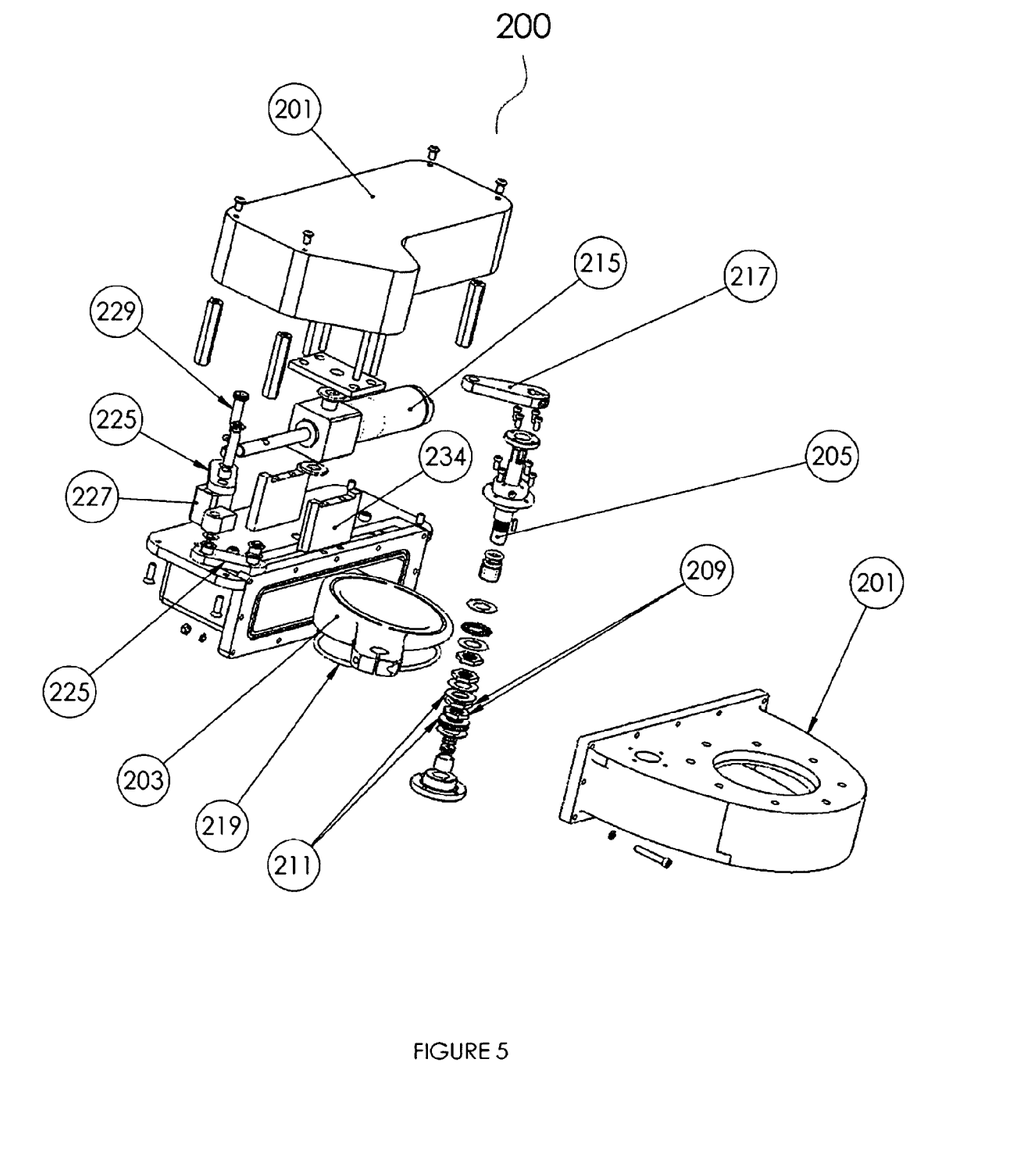
FIG. 5 is an exploded view of the entire assembly of the valve.
Figure 6:
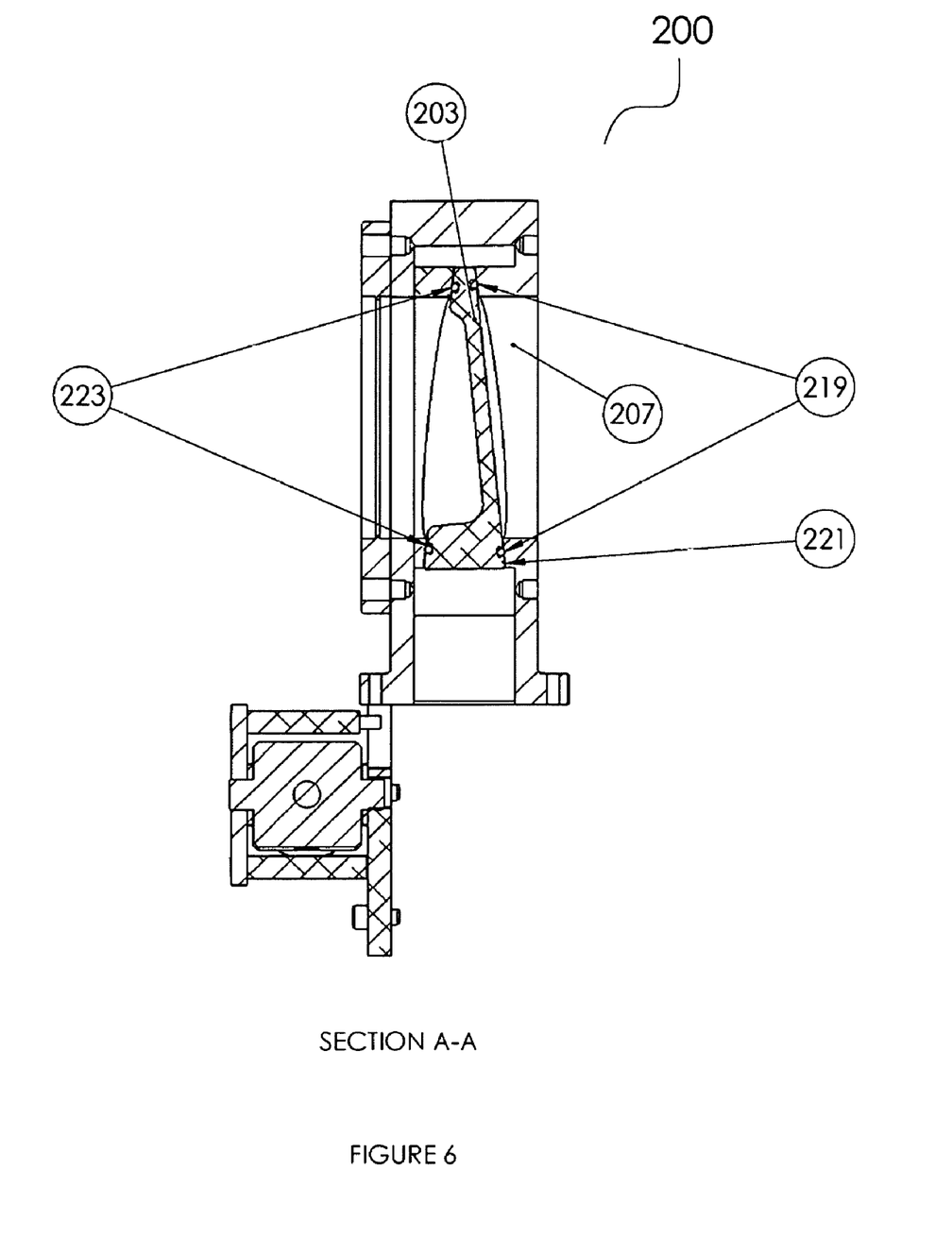
FIG. 6 is a cutaway view of the dual wedge design of the valve with the valve in the closed position.

FIGS. 2, 3, 4, 5, and 6 illustrate an exemplary dual wedge valve 200, in accordance with an embodiment of the present invention. FIG. 2 is a side view of valve 200 in a closed position, where body covers 201 of valve 200 have been removed to show the inside of valve 200. FIG. 3 is a top view of valve 200 in the closed position. FIG. 4 is a top, transparent view of valve 200 in an open position. FIG. 5 is an exploded view of the entire assembly of valve 200, and FIG. 6 is a cutaway view of the dual wedge design of valve 200 with valve 200 in the closed position. In the present embodiment valve 200 is sealed vacuum tight when in the closed position. Valve 200 comprises a male wedge arm 203 at a set angle that rotates on a fixed shaft 205 into a fixed female wedge 207 at a set angle.

Referring to FIG. 2, male wedge arm 203 is shown in the closed position. Both sides of male wedge arm 203 are angled at 7.5 degrees, and male wedge arm 203 swings into fixed female wedge 207 also with 7.5-degree angles on each side. Alternate embodiments may comprise wedges with various different angles. Furthermore, in some embodiments the angle of the top surface of the wedge may be different from the angle of the bottom surface of the wedge as long as the angles of the male and female wedges match to create a vacuum tight seal.

Referring to FIGS. 2 and 5, shaft 205 on which male wedge arm 203 rotates is captured within the body of valve 200 using O-rings to seal shaft 205 where it protrudes from the body of valve 200. Male wedge arm 203 is mounted on shaft 205, being held in position by threaded nuts 209 and washers 211, thus enabling male wedge 203 to be adjustable in the Z position by moving threaded nuts 209, washers 211 and male wedge arm 203 up or down shaft 205. Once male wedge arm 203 is properly located on shaft 205 to fit within female wedge 207, threaded nuts 209 and washers 211 restrain movement of male wedge arm 203 along shaft 205, thus holding male wedge arm 203 in place. A key 213 is used to prevent male wedge arm 203 from rotating on shaft 205, along with a bolt that clamps male wedge arm 203 around shaft 205. Alternate embodiments may not enable the male wedge arm to be adjusted. In the present embodiment, the upper portion of shaft 205 is locked to an air cylinder 215 to push a drive arm 217 without fear of rotating on shaft 205.

Referring to FIGS. 2 and 6, an o-ring 219 on male wedge arm 203 comes into contact with an ultra polished surface 221 of female wedge 207 just prior to male wedge arm 203 wedging into fixed female wedge 207. In alternate embodiments, the o-ring may be attached to the female wedge and the male wedge arm may have an ultra polished surface. In the present embodiment, o-ring 219 briefly slides on polished surface 221 on the bottom side of female wedge 207 when valve 200 closes to perform the sealing action. Polished surface 221 of female wedge 207 has an ultra smooth surface finish in the area where o-ring 219 contacts, for example, without limitation, a 16-finish surface, a non-stick coating, etc. Polished surface 221 aids in preventing damage and wear to o-ring 219. On the side of male wedge arm 203 opposite o-ring 219, a Kynar rod 223 is placed in an o-ring groove and is used to provide the sliding action required when male wedge arm 203 comes into contact with the opening of fixed female wedge 207. Those skilled in the art, in light of the present teachings, will readily recognize that a multiplicity of suitable means may be used to provide the sliding action between the male wedge and the female wedge such as, but not limited to, other types of smooth, non-wear materials, ball bearings, air bearings, etc. Furthermore, in alternate embodiments the means for providing the sliding action may be incorporated into the female wedge rather than the male wedge arm. In the present embodiment as male wedge arm 203 is driven into female wedge 207, male wedge arm 203 pushes against polished surface 221 of female wedge 207 and Kynar rod 223 pushes against the opposite surface of female wedge 207. This action compresses o-ring 219 against polished surface 221 to form a vacuum tight seal.

Referring to FIGS. 3 and 4, the drive system comprises drive arm 217 mounted on shaft 205, attached to a fixed length link of a three-part linkage 225, which in turn is attached to another link of three-part linkage 225, which is attached at the other end to a fixed linkage mount 227 with a shoulder bolt 229. Air cylinder 215 actuates valve 200 by driving a three-part linkage 225, which actuates drive arm 217, which rotates male wedge arm 203 by rotating shaft 205. Alternate embodiments may be implemented without a three-part linkage. In these embodiments the air cylinder is connected directly to the drive arm, and the end of the drive arm not connected to the air cylinder is connected to the shaft. In the present embodiment, air cylinder 215 is a 1.5" bore pneumatic air cylinder; however, alternate embodiments may comprise air cylinders of various sizes depending on factors such as, but not limited to, the size of the valve or the application of the valve. Other alternate embodiments may use different means for actuating the valve such as, but not limited to, hydraulic cylinders, electric motors, manual levers, etc. In the present embodiment, air cylinder 215 comprises two magnetic reed switches on each end of the air cylinder stroke to indicate the open and closed positions. Air cylinder 215 is pivotally mounted to valve 200 with a mount bracket 231 at a pivot point 233. Shaft 205 is rotated by air cylinder 215 by pushing three-part linkage 225 and drive arm 217, which is clamped to shaft 205. When air cylinder 215 is in an extended position, the valve is in the open position, and as the shaft of air cylinder 209 retracts, drive arm 217 rotates, thus rotating male wedge arm 203 into female wedge 207. Referring to FIG. 4, air cylinder 215 is shown fully extended, which fully extends three-part linkage 225 so that drive arm 217 is in line with the adjacent link of three-part linkage 225 and opens valve 200, and referring to FIG. 3, air cylinder 215 is shown in the fully retracted position, which fully retracts three-part linkage 225 so that drive arm 217 is at a 90-degree angle to the adjacent link of three-part linkage 225 and closes valve 200. In alternate embodiments, the drive system may be configured differently so that the links of the three-part linkage and the drive arm create various different angles in the open and closed positions. In the present embodiment, three-part linkage 225 enables valve 200 to remain sealed, or locked over, in the event of a power failure. The lock over refers to the angle of drive arm 217 and linkage 225 being at an angle at least 1 degree greater than 90 degrees. If a force is applied externally to the male wedge 203 to attempt to open the valve, the angle prevents the male wedge 203 from moving or backing out, and only when the air cylinder 215 is activated can the valve open.

Referring to FIGS. 3 and 4, a typical mounting flange 235 is also shown on body cover 201. Mounting flange 235 enables valve 200 to be mounted to other components in the system. Those skilled in the art, in light of the present teachings, will readily recognize that a multiplicity of suitable mounting flanges are available for use on valve 200, for example, without limitation, flanges of different shapes such as, but not limited to, squares or rectangles.

Figure 7:
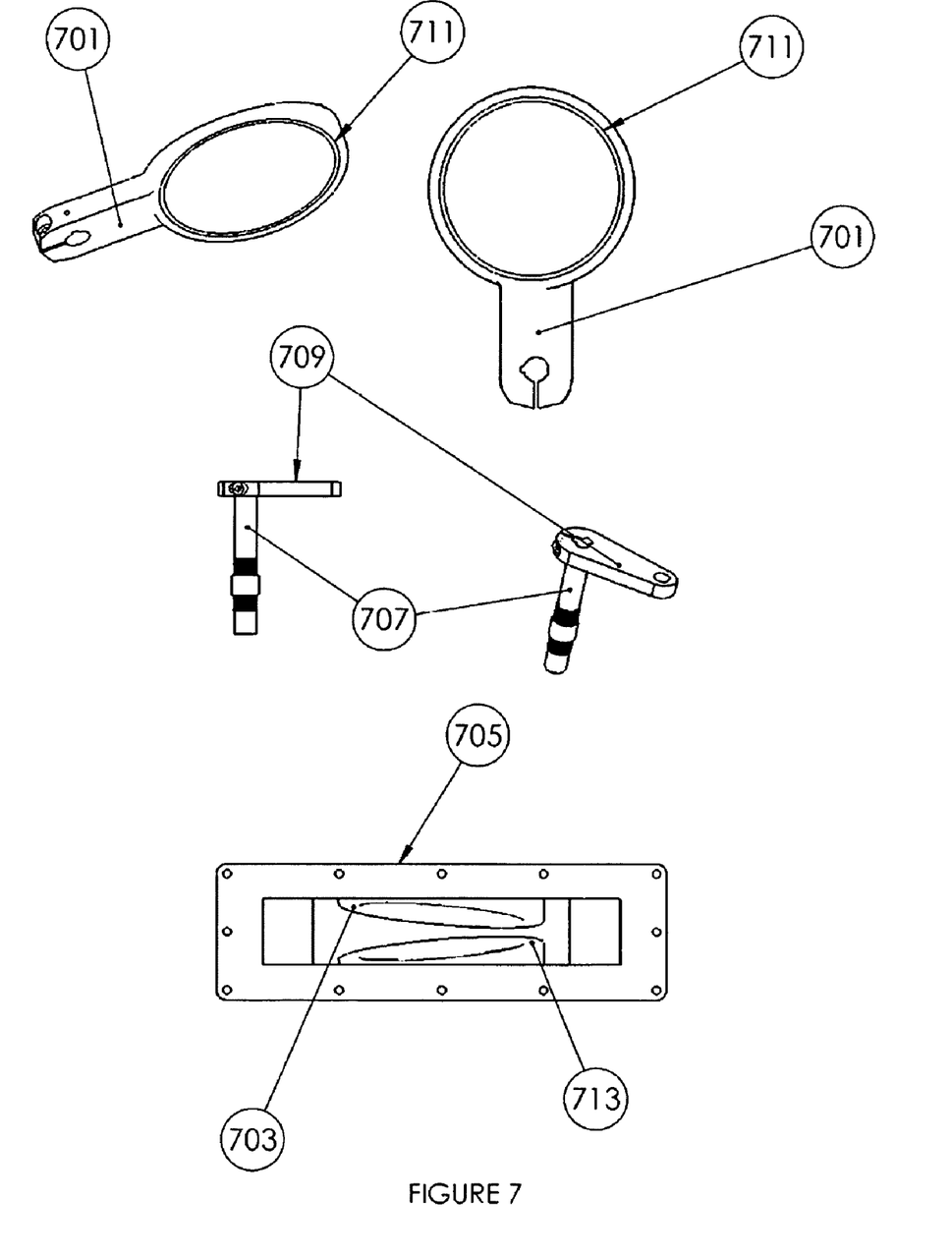
FIG. 7 shows exemplary components of a dual wedge valve, in accordance with an embodiment of the present invention.

FIG. 7 shows exemplary components of a dual wedge valve, in accordance with an embodiment of the present invention. The components shown in FIG. 7 include a male wedge arm 701, a female wedge 703 within a valve body 705 and a drive shaft 707 on a drive arm 709. Male wedge arm 701 comprises a top surface and a bottom surface; each sloped at a 7.5-degree angle to create a total angle of 15 degrees within male wedge arm 701. Female wedge 703 also comprises a top surface and a bottom surface; each sloped at 7.5 degrees to match the angle of male wedge arm 701. In alternate embodiments, the surfaces of the male wedge arm and the female wedge may be sloped at angles other than 7.5 degrees. The top and bottom surfaces of male wedge arm 701 each have an o-ring groove 711. An o-ring may be inserted into one o-ring groove 711 to create a vacuum tight seal when the valve is closed, and a smooth, non-wear material, such as, but not limited to, Kynar, or other sliding means such as, but not limited to, ball bearings, may be inserted into the other o-ring groove 711 to facilitate the sliding of male wedge arm 701 along female wedge 703. The o-ring of male wedge arm 701 slides on and creates a seal with an ultra smooth, polished surface 713 of female wedge 703. When in an assembled valve, male wedge arm 701 is attached to drive shaft 707. When drive shaft 707 is actuated by drive arm 709, male wedge arm 701 rotates into or out of female wedge 703.

Figure 8:
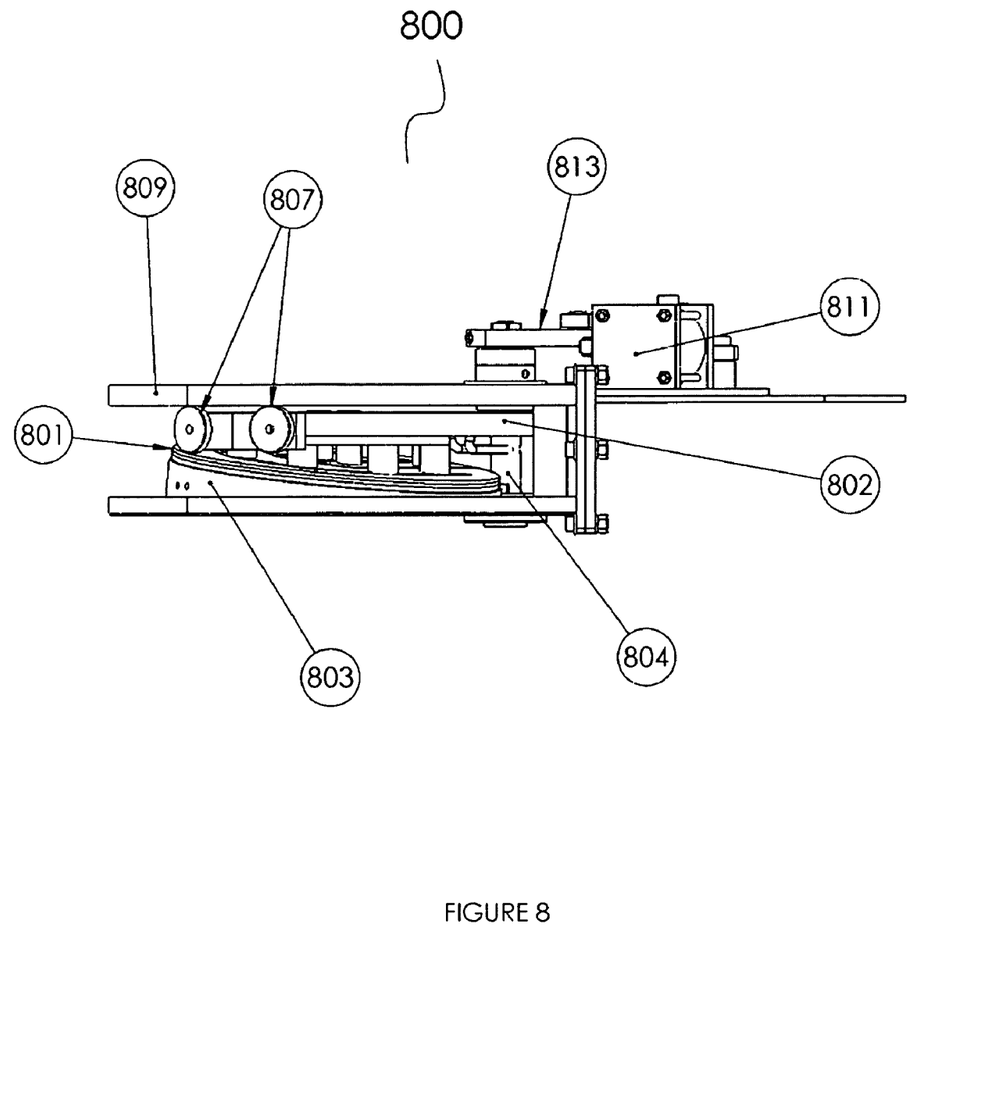
FIG. 8 is a side view of the single wedge gate valve in a closed position without body sides for clarity.
Figure 9:
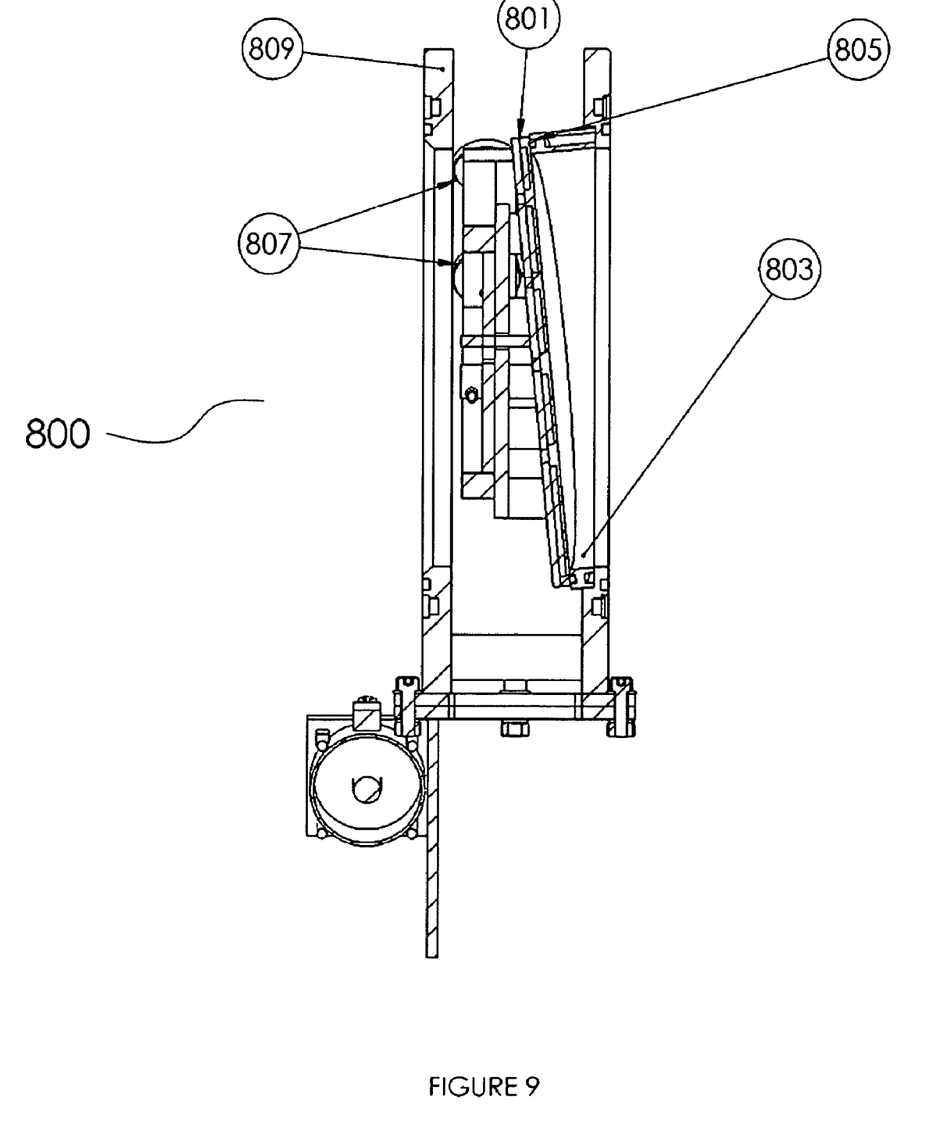
FIG. 9 is a cross-sectional view of the single wedge gate valve in the closed position.
Figure 10:
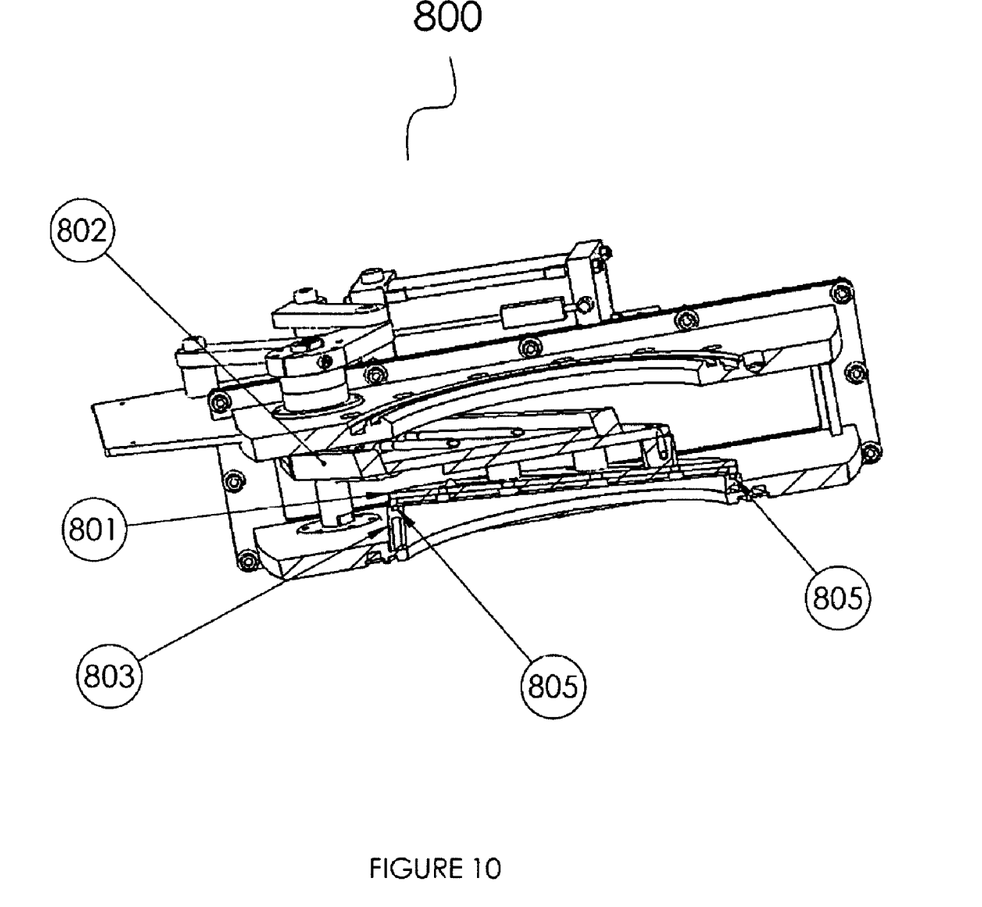
FIG. 10 is a section view of the single wedge gate valve.

FIGS. 8, 9 and 10 illustrate an exemplary single wedge gate valve 800, in accordance with an embodiment of the present invention. FIG. 8 is a side view of single wedge gate valve 800 in a closed position without body sides for clarity. FIG. 9 is a cross-sectional view of single wedge gate valve 800 in the closed position, and FIG. 10 is a section view of single wedge gate valve 800. In the present embodiment, valve 800 comprises a rotating wedge 801 and a fixed wedge 803. Rotating wedge 801 is a smooth faced plate that swings on a wedge arm 802 on a fixed shaft 804 toward fixed wedge 803 with a captive o-ring 805. In the present embodiment, o-ring 805 is set into fixed wedge 803, and rotating wedge 801 has an ultra smooth surface, for example, without limitation, a 16-finish or a non-stick coating, in the area where rotating wedge 801 comes into contact with o-ring 805. In alternate embodiments the o-ring may be set into the rotating wedge, and the fixed wedge may have an ultra smooth finish. In the present embodiment, wedge arm 802 swings on a fixed horizontal plane. Two wheels 807 roll on an upper plate 809 creating additional pressure on rotating wedge 801 to force rotating wedge 801 against o-ring 805 in fixed wedge 803. Those skilled in the art, in light of the present teachings, will readily recognize that a multiplicity of suitable means may be used to create additional pressure on the rotating wedge in alternate embodiments, such as, but not limited to, rollers, ball bearings, etc. In the present embodiment, rotating wedge 801 and fixed wedge 803 each have a 7.5-degree surface; however, alternate embodiments may comprise wedges with various different angles. Referring to FIG. 10, the surfaces of rotating wedge 801 and fixed wedge 803 are non-parallel when in an open position, and these surfaces become parallel as rotating wedge 801 comes into contact with o-ring 805, mounted on fixed wedge 803.

Similarly to the embodiment shown by way of example in FIGS. 2 through 6, to actuate rotating wedge 801, an air cylinder 811 drives a drive arm 813, which rotates shaft 804. Wedge arm 802, which is attached to rotating wedge 801, is locked to shaft 804 and rotates when shaft 804 is rotated by drive arm 813. Some embodiments may comprise a three-part linkage in the drive system, and other embodiments may not comprise a three-part linkage. Furthermore, those skilled in the art, in light of the present teachings, will readily recognize that the rotating wedge may be actuated by various different means other than an air cylinder in alternate embodiments such as, but not limited to, a hydraulic cylinder, an electric motor, a manual lever, etc. In the present embodiment, rotating wedge 801 and fixed wedge 803 generally do not require adjusting. However, adjusting may be performed by sliding wedge arm 802 up or down shaft 804 and using threaded nuts and/or a key to hold wedge arm 802 in place. Alternate embodiments may be implemented that are not adjustable. Referring to FIGS. 8, 9 and 10, single wedge embodiments have benefits over existing valves including, without limitation, a high cycle life because of the lack of bellows, the ability to water cool with no lines, ease of repair and maintenance, and suitability for throttling from completely closed to fully open.

Those skilled in the art, in light of the present teachings, will readily recognize that embodiments of the present invention may be used in various different applications. The foregoing description was directed to embodiments for use in vacuum process control systems; however, embodiments of the present invention may be used in other types of systems including, without limitation, fluid control systems, systems to control the flow of a gas, etc. Furthermore, some of these applications may not require a vacuum tight seal. Embodiments of the present invention for use in applications not requiring a vacuum tight seal may be implemented without sealing components such as, but not limited to, the o-ring or the ultra smooth surface on the wedge.

Having fully described at least one embodiment of the present invention, other equivalent or alternative methods of providing a pendulum valve incorporating wedges according to the present invention will be apparent to those skilled in the art. The invention has been described above by way of illustration, and the specific embodiments disclosed are not intended to limit the invention to the particular forms disclosed. For example, the particular implementation of the male wedge may vary depending upon the particular type of female wedge used. The male wedges described in the foregoing were directed to implementations with flat surfaces; however, similar techniques are to use wedges with curved surfaces. Curved implementations of the present invention are contemplated as within the scope of the present invention. The invention is thus to cover all modifications, equivalents, and alternatives falling within the spirit and scope of the following claims.

What is claimed is:

1. An apparatus for a gate valve between chambers, the apparatus comprising:
   a valve housing defining a flow path between the chambers;
   a male valve portion rotatable on a fixed axis in said housing, said male valve portion comprising at least a first male mating surface positioned at a first angle less than perpendicular to said axis;
   a female valve portion fixed in said valve housing for receiving said male portion, said female valve portion comprising at least a first female mating surface positioned at a second angle matching said first angle;
   an o-ring for sealing said male valve portion to said female valve portion when said male valve portion is rotated into said female valve portion from a fully open position to a fully closed position;
   a polished surface which said o-ring contacts when said male valve portion is rotated;
   means for providing a sliding action between said male valve portion and said female valve portion when said male valve portion is rotated into said female valve portion, said means for providing a sliding action compressing said o-ring in said fully closed position thereby sealing the gate valve and closing said flow path; and
   means for rotating said male valve portion between said fully open position and said fully closed position means for linking said means for rotating and said male valve portion where said linking means maintains said male valve portion in said fully closed position when said means for rotating is inoperative.

2. The apparatus as recited in claim 1, wherein the chambers are vacuum pressure chambers and said o-ring provides a vacuum tight seal.

3. The apparatus as recited in claim 2, wherein said male valve portion is rotatable when pressures in the chambers are differentiated.

4. The apparatus as recited in claim 1, wherein said means for rotating is continuously operable for throttling between said fully open position and said fully closed position.

5. The apparatus as recited in claim 1, wherein said male valve portion further comprises a second male mating surface positioned at a third angle less than perpendicular to said axis and said female valve portion further comprises a second female mating portion positioned at a fourth angle matching said third angle.

6. The apparatus as recited in claim 5, wherein said o-ring is on said first male mating surface, said polished surface is on said first female mating surface and said sliding action means provides said sliding action between said second male mating surface and said second female mating surface.

7. The apparatus as recited in claim 1, wherein said male valve portion further comprises a second male mating surface substantially perpendicular to said axis and said female valve portion further comprises a second female mating portion substantially perpendicular to said axis.

8. The apparatus as recited in claim 7, wherein said o-ring is on said first female mating surface, said polished surface is on said first male mating surface and said sliding action means provides said sliding action between said second male mating surface and said second female mating surface.

9. An apparatus for a gate valve between chambers, the apparatus comprising:
   a valve housing defining a flow path between the chambers;
   a male valve portion rotatable on a fixed axis in said housing, said male valve portion comprising a first male mating surface positioned at a first angle less than perpendicular to said axis and a second male mating surface positioned at a second angle less than perpendicular to said axis;
   a female valve portion fixed in said valve housing for receiving said male portion, said female valve portion comprising a first female mating surface positioned at a third angle matching said first angle and a second female mating surface positioned at a fourth angle matching said second angle;
   an o-ring positioned on said first male matting portion for sealing said male valve portion to said female valve portion when said male valve portion is rotated into said female valve portion from a fully open position to a fully closed position;
   a polished surface on said first female portion which said o-ring contacts when said male valve portion is rotated;
   a slider between said second male valve portion and said second female valve portion where when said male valve portion is rotated into said female valve portion, said slider provides a sliding action and compresses said o-ring in said fully closed position thereby sealing the gate valve and closing said flow path; and
   an actuator rotating said male valve portion between said fully open position and said fully closed position a linkage between said actuator and said male valve portion where said linkage maintains said male valve portion in said fully closed position when said actuator loses power.

10. The apparatus as recited in claim 9, wherein said linkage comprises a three-part linkage.

11. The apparatus as recited in claim 9, wherein said male and female mating portions further comprise generally circular shapes.

12. The apparatus as recited in claim 9, wherein said o-ring is positioned in an o-ring groove.

13. The apparatus as recited in claim 12, wherein said slider comprises a polyvinylidene fluoride rod in the o-ring groove on said second male mating surface.

14. The apparatus as recited in claim 9, wherein the chambers are vacuum pressure chambers and said o-ring provides a vacuum tight seal.

15. The apparatus as recited in claim 14, wherein said male valve portion is rotatable when pressures in the chambers are differentiated.

16. The apparatus as recited in claim 9, wherein said actuator is continuously operable for throttling between said fully open position and said fully closed position.

* * * * *